(12) United States Patent
Waschura et al.

(10) Patent No.: US 7,386,405 B2
(45) Date of Patent: Jun. 10, 2008

(54) APPARATUS AND METHOD FOR SAMPLING EYE DIAGRAMS WITH WINDOW COMPARATORS

(75) Inventors: Thomas Eugene Waschura, Menlo Park, CA (US); Andrei Poskatcheev, Menlo Park, CA (US)

(73) Assignee: Synthesys Research Inc, Menlo Park, CA (US)

( * ) Notice: Subject to any disclaimer, the term of this patent is extended or adjusted under 35 U.S.C. 154(b) by 269 days.

(21) Appl. No.: 11/376,485

(22) Filed: Mar. 14, 2006

(65) Prior Publication Data

US 2007/0088514 A1 Apr. 19, 2007

Related U.S. Application Data

(63) Continuation of application No. 09/996,342, filed on Nov. 21, 2001, now abandoned.

(51) Int. Cl.
*G06F 19/00* (2006.01)

(52) U.S. Cl. .................................................... 702/65
(58) Field of Classification Search ................. 702/65
See application file for complete search history.

(56) References Cited

U.S. PATENT DOCUMENTS

2006/0142877 A1* 6/2006 Solomon ..................... 700/11

* cited by examiner

*Primary Examiner*—Tung S Lau
(74) *Attorney, Agent, or Firm*—Peninsula IP Group; Douglas A. Chaikin (57) ABSTRACT

Apparatus and method for determining characteristics of a bit stream of binary pulses. The apparatus has control apparatus for defining a window comparator and logic apparatus for accumulating and mapping numbers derived from a count of the number of times the bit stream pulses fall at points inside the window comparator and drawing an eye diagram defining characteristics of the bit stream.

13 Claims, 6 Drawing Sheets

APPARATUS AND METHOD FOR SAMPLING EYE DIAGRAMS WITH WINDOW COMPARATORS

This case is a continuation application from Ser. No. 09/996,342 filed Nov. 21, 2001 now abandoned, which is currently on Appeal.

FIELD OF THE INVENTION

This invention relates to apparatus and a method for analyzing a waveform and in particular to apparatus and method for creating eye diagrams of a high speed binary pulse coded bit stream with window comparators.

BACKGROUND OF THE INVENTION

High-speed communication systems typically communicate with each other by sending serial bit streams of data between transmitters and receivers. These bit streams are usually binary coded pulse signals represented by zeros and ones which may be electrical voltages or optical signals derived from the signals created by the transmitters and which pulse coded signals are applied to a transmission facility connecting the transmitters with the receivers. The receivers decode the received pulse code signal data to obtain the information therein.

If a receiver receives pulse code signals that have been deformed by errors occurring in the transmission facility or if the receiver improperly decodes the received pulse coded signals, the effect is that bit errors may occur in the communications thereby resulting in wrong information being received by the receiver. Thus, designers, engineers, installers and maintenance personal need to evaluate the stream of pulse coded signals, oftentimes called binary pulse bit streams, to monitor system performance and to help in diagnosing system problems. It is typical to monitor the quality of such bit streams by using a sampling oscilloscope.

In the monitoring operation, the binary pulse bit stream and a trigger input in the form of a clock signal having a repetition rate identical to the repetition rate of the binary pulses in the bit stream and synchronous therewith are applied to the inputs of the sampling oscilloscope. Samples of the voltage levels of the binary pulses of the bit stream are taken at various time offsets from the repetitive trigger input and are plotted as sample points on the display of the oscilloscope. Voltage samples are continuously taken of the bit stream and added to the sampling oscilloscope in combination with the older sample points which continue to exist on the sampling oscilloscope display. Over a relatively short period of time, hundreds or thousands of the sample points on the sampling oscilloscope display plot the possible voltage distributions at each time offset from the trigger input. By sweeping all time offsets in the range of interest, a diagram appears on the sampling oscilloscope display which reveals the quality or characteristics of the measured high-speed bit stream. This type of diagram, oftentimes called an "eye" diagram, is often used to view high speed binary pulse bit streams during the various development, installation and maintenance phases of high-speed communications systems.

A problem exists in using sampling oscilloscopes in this manner to measure the quality of high-speed communication systems. As the bit stream data rate increases, the bandwidth of the sampling oscilloscopes needed to create the eye diagrams increases proportionally thereby resulting in a higher cost. Another problem arises in that as the cost of the sampling oscilloscopes increases and due to the design issues of super high-speed systems, the present sampling methods takes samples at a relatively few of all the possible edges of the bit stream pulses thereby limiting the current effective sampling rate to the range of one hundred to two hundred thousand samples per second.

Another type of apparatus has been developed to create an eye diagram for statistically measuring the quality of high speed binary pulse bit streams. A problem exists with this apparatus in that it requires that multiple histrograms be created and combined to establish an eye diagram and that two histograms are required to be created to make an eye diagram. Subtractions from neighboring vertical elements in the first histrogram are required to make the second histrogram which is what is used to make the eye diagram. If the data count of the user signal passing through the device under test changes drastically between the times the two vertical elements are taken, noise can be added to the subtracted results causing noise in the eye diagram. Accordingly, a need exists in the art for apparatus and a method for creating a noise free single histrogram actively determining an eye diagram for measuring the characteristics of high-speed binary pulse bit streams used to transfer information and data between communications systems.

SUMMARY OF THE INVENTION

It is an object of the invention to provide apparatus and a method for measuring characteristics of a bit stream of binary pulses with control apparatus arranged to define a window comparator and with logic apparatus for accumulating event counts of the bit stream pulses falling within points inside the window comparator during durations of the binary pulse bit stream at different time offsets and voltage window positions and drawing eye diagrams therefrom defining the bit stream characteristics.

It is also an object of the invention to establish a window comparator of an array of columns and rows defining points for accumulating event counts of a binary pulse bit stream at times during defined durations of the binary pulse bit stream.

It is also an object of the invention to create a voltage threshold window that moves between a minimum voltage and a maximum voltage with changes of rows of a column and row array and to accumulate counts of voltage levels of the binary pulses occurring within the voltage threshold and at time offsets of a binary bit pulse stream during a duration time at each row and column point of the array and to display the array column and row points of the accumulated counts as an eye diagram defining characteristics of the bit stream of binary pulses.

In a preferred embodiment of the invention, apparatus defines a window comparator of an array of columns and rows defining points for accumulating event counts at time offsets during defined duration times of a binary pulse bit stream and creates a voltage threshold window that that moves between a minimum voltage and a maximum voltage with changes of the rows of the array. Logic apparatus detects voltage levels of binary pulses occurring at time offsets of the bit stream when the pulse voltage levels are within the voltage threshold window at each row and column point of the array. Counter apparatus accumulates counts of the detected binary pulse voltage levels at the time offsets during each defined duration time of the binary pulse bit stream in a column and row point of the array wherein counter apparatus determines durations of the bit stream of binary bit stream in which to accumulate the detected binary pulse voltage levels at each point of the array. Monitor apparatus displays the array column and row points of the accumulated event counts as an eye diagram defining characteristics of the bit stream of binary pulses.

Also in accordance with the preferred embodiment of the invention, a method for determining characteristics of a bit stream of binary pulses defines a window comparator of an array of columns and rows defining points for accumulating voltage counts at times during defined duration time offsets of the binary pulse bit stream. The method creates a voltage threshold window between a minimum voltage threshold and a maximum voltage threshold wherein the voltage threshold window changes with each change of the rows of the array. Voltage levels of binary pulses occurring at time offsets of the bit stream are detected when the pulse voltage levels are within the voltage threshold window at each row and column point of the array. Counts of the detected binary pulse voltage levels are accumulated at the time offsets during each defined duration time of the binary pulse bit stream in a column and row point of the array and displayed as an eye diagram defining characteristics of the bit stream of binary pulses.

BRIEF DESCRIPTION OF THE DRAWINGS

For a further understanding of the objects and advantages of the present invention, reference should be had to the following detailed description, taken in conjunction with the accompanying drawing figures, in which like parts are given like reference numerals and wherein.

Figure 2:
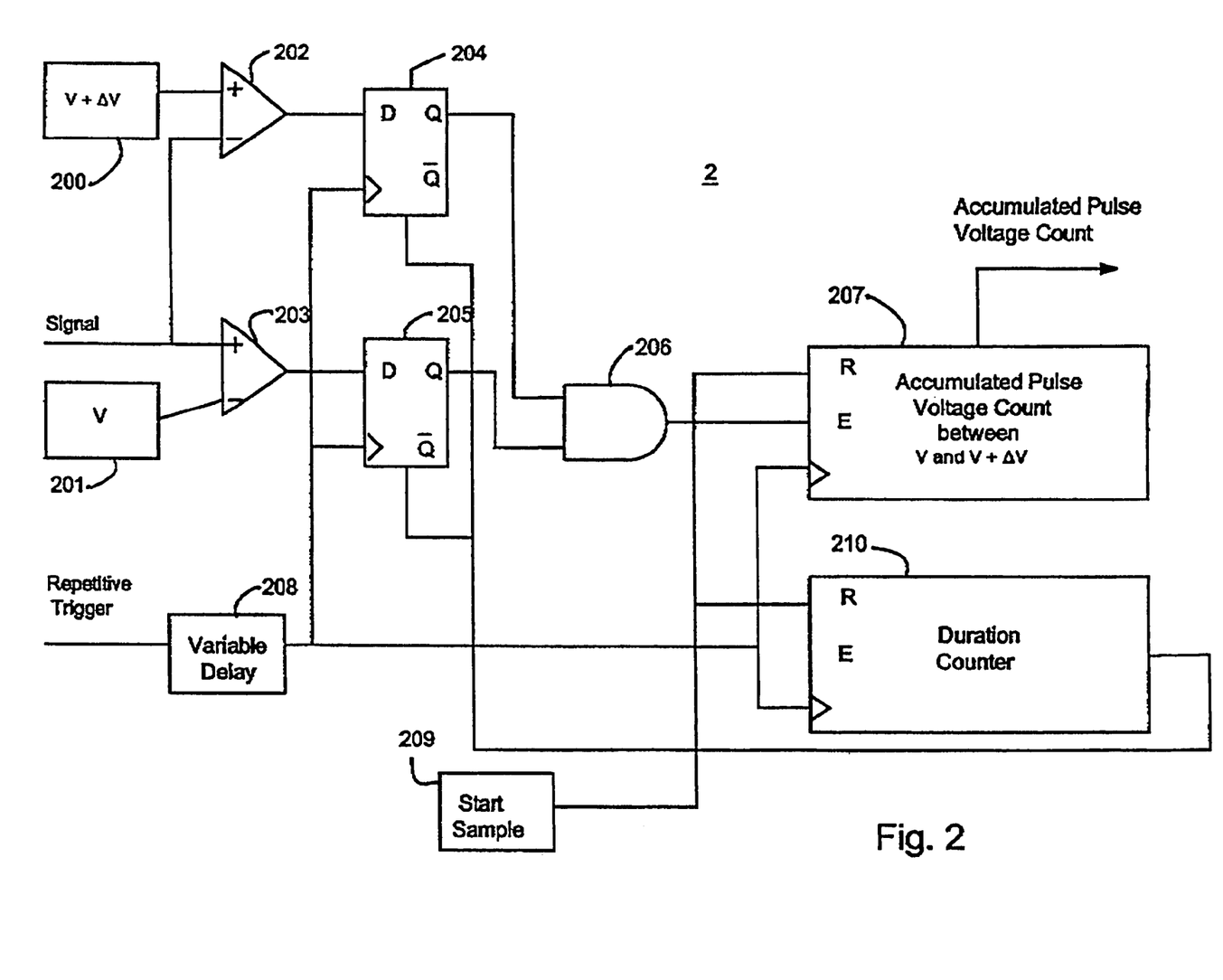
FIG. 2 is a block diagram of count logic circuitry set forth in FIG. 1.

The logic component circuitry of the threshold logic apparatus set forth in FIG. 2 of the drawing is performed by logic circuitry and central processor units, the individual operation of which are well known in the art and the details of which need not be disclosed for an understanding of the invention. Typical examples of these logic circuitry are described in numerous textbooks. For example, such types of logic circuitry, among others, are described by J. Millman and H, Taub in *Pulse, Digital and Switching Waveforms*, 1965, McGraw-Hall, Inc., H. Alex Romanowitz and Russell E. Puckett in *Introduction to Electronics*, 1968, John Wiley & Sons, Inc., E. J. Angelo, Jr. in *Electronic Circuits*, Second Edition, 1958, McGraw Hill, Inc. and in *The TTL Data Book for Design Engineers*, Second Edition, 1976, Texas Instruments Incorporated.

DETAILED DESCRIPTION

Figure 1:
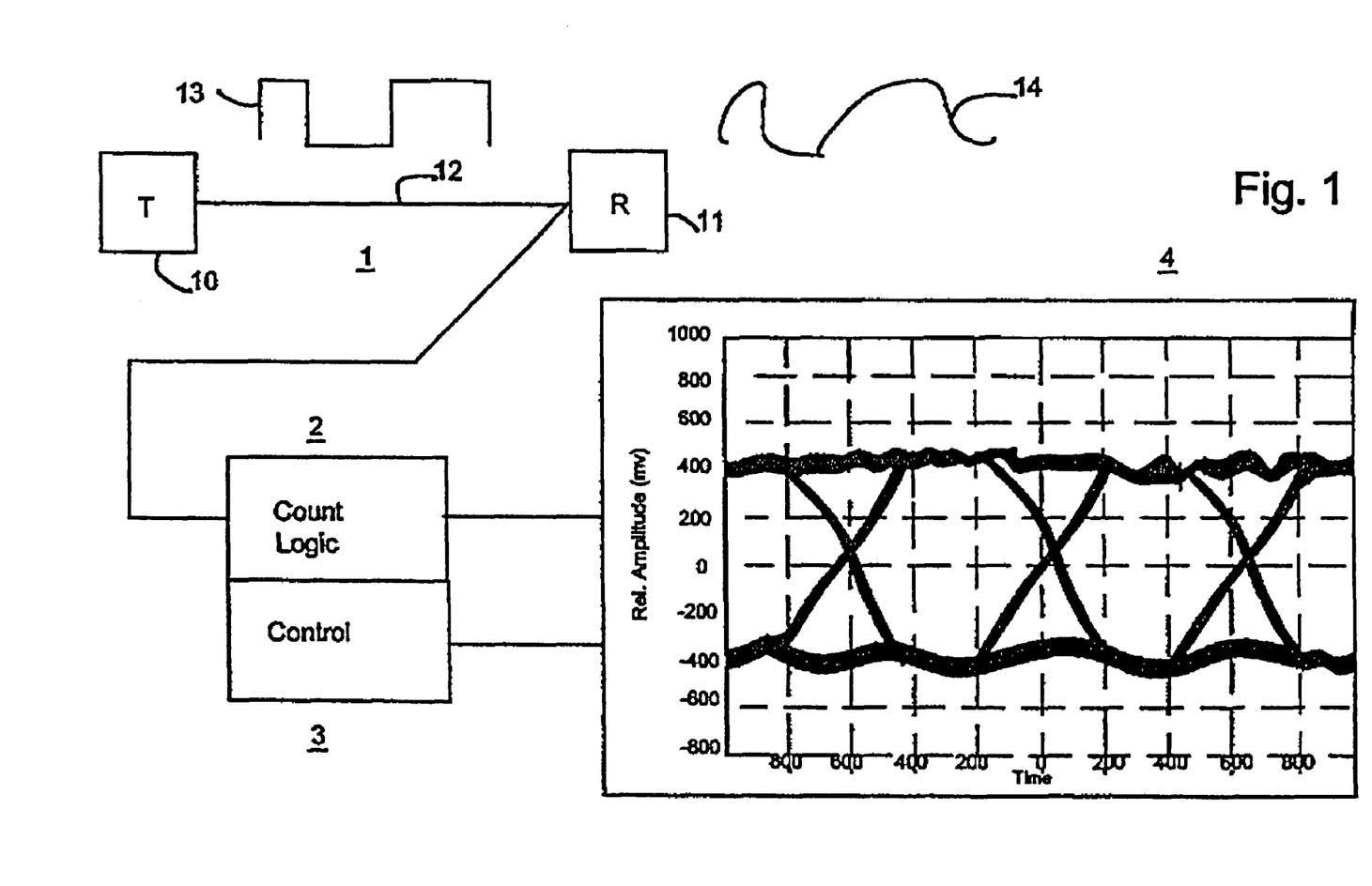
FIG. 1 is a block diagram of binary pulse coded waveform measuring apparatus in accordance with the principles of the invention connected to a communication system for generating eye diagram measurements of a binary pulse coded waveform bit stream transmitted from a system transmitter to a system receiver.

Referring to FIG. 1 of the drawing, high speed communication system 1 consists of a transmitter 10 interconnected by a transmission facility 12 with a receiver 11. Information is transmitted to receiver 11 by transmitter 10 in a binary coded pulse format as a high speed binary pulse bit stream 13 applied to the input of transmission facility 12. Transmission facility 12 may be any one of a large number of high speed transmission facilities such as printed circuit board traces, coaxial cables, optical fibers, radio and satellite links or the like. In a typical application, the binary pulses of input binary bit stream 13 may be reconfigured by the characteristics of the transmission facility 12 and appear as the rounded binary coded pulse format shown as the binary bit stream 14 received by receiver 11. The binary pulse coded waveform measuring apparatus may be connected to transmission facility 12 at either the output of transmitter 10, the input of receiver 11, at various locations along transmission facility 12 or at various locations within transmitter 10 and receiver 11 wherein it is desired to measure the quality and characteristics of the transmitted and received binary pulse coded bit streams 13 and 14. In operation, control apparatus 3 controls the operation of count logic 2 to generate an eye diagram representing the quality characteristics of the measured the binary pulse coded bit streams 13 and 14 on display apparatus 4 which may be any one of a number of well known display devices such as a computer, stand alone monitors, plotters, various storage devices, work stations or the like. The configuration of the eye diagram displayed on monitor 4 shows the characteristics of the measured binary pulse bit stream.

In general, a binary pulse coded bit stream consists of a series of succeeding "0" and "1" pulses wherein each "0" pulse is transmitted at one voltage level and each "1" pulse is transmitted at another voltage level. The specific sequence of the "0" and "1" pulses define the information or data transmitted by transmitter 10 to receiver 11. The pulses have a repetition rate wherein each pulse has a period of time, hereinafter referred to as the pulse period, and follows a preceding pulse at the repetition rate determined by the communication system clock. In an exemplary embodiment of the invention, apparatus in accordance with the invention for measuring the characteristics of the bit stream of binary pulses 13, 14 has control apparatus 3 for defining a window comparator. Control apparatus 3 may be a computer, processor, work station, or the like, the details of which are well known, and which is specifically programmed or configured to establish an array, FIG. 3, of columns and rows defining the points for accumulating event counts at time offsets during the defined durations of the measured binary pulse bit stream. Data collected from the measured waveform of the binary pulse bit stream is accumulated at each column and row location, hereinafter called points, for a defined duration of a part of the binary pulse bit stream. The accumulated data is then drawn as an eye diagram, FIG. 1, on monitor 4 to define characteristics of the binary pulse bit streams 13 and 14.

Control apparatus 3, FIG. 1, is programmed to create a voltage threshold window that moves between a minimum voltage $V_{MIN}$ and a maximum voltage $V_{MAX}$ with row changes of the array and which has an incremental voltage $\Delta V$ difference equal to the value of $(V_{MIN}-V_{MAX})$ divided by the maximum number of rows in the array. Count logic apparatus 2 detects voltage levels of the binary pulses occurring at time offsets of the bit stream when the pulse voltage levels are within the voltage threshold window and accumulates the counts during the duration times at each row and column point of the array. In particular, control apparatus 3, FIG. 2, applies a value of voltage $V+\Delta V$, 200, to the plus input of comparator 202 and a value of voltage V, 201, to the minus input of comparator 203 to create a voltage threshold window. The count logic apparatus 2 responds to a signal occurring during the duration of a part of the binary pulse bit stream by detecting the voltage level of a pulse at a time offset and determines if the measured pulse voltage level is within the voltage threshold window levels defined by the window comparator of the array. When the measured pulse voltage level is below the threshold voltage level V+ΔV, comparator 202 operates to set logic device 204. If the measured pulse voltage level is above the threshold voltage level V, comparator 203 operates to set logic device 203. The setting of logic devices 204 and 205 enable AND gate 206 to indicate that the measured pulse level is within the voltage threshold window between the value of V and V+ΔV for each column and row of the array. Logic counter 207 accumulates counts of the detected binary pulse voltage levels within the voltage threshold window at time offsets during each duration part of the binary pulse bit stream in a column and row point of the array.

Count logic 2 has a duration counter 210 that responds to a repetitive trigger by counting the repetitive trigger up to a value of $duration_{MAX}$. The value of $duration_{MAX}$ is defined as the duration time of the binary pulse bit stream during which events of the pulse voltage count levels are accumulated within the voltage threshold window at each column and row point of the array. The value of $duration_{MAX}$ defines how much total time will be required to gather enough event counts to complete the eye diagram. Typically, the value of duration of $duration_{MAX}$ for each column and row point may be the number of pulses themselves. When the column and row point sample is to be taken or started, counters 207 and 210 are reset to their initial count value of zero. The initial count for a particular array column and row point is started by identifying a column 1 and row 1 and starting an event count of the pulse voltage levels that are within the voltage threshold window. A repetitive initialization starts each count of the measurement of the pulse events by resetting logic devices which then records pulse voltage levels within the voltage threshold window voltage levels. Each valid count is accumulated by logic counter 207 and recorded at the end of the duration period determined by duration counter 210 in the array column 1 and row 1 point. The row count is advanced to row 2, the voltage threshold window thresholds incremented by ΔV, and the count sequence repeated for a change of the voltage threshold window during the duration time and recorded in array column 1 and row 2 point. Although the count as herein described started at array column 1 and row 1 it is exemplarily only and it is to be understood that in accordance with the invention, the count could be started at array column 1 and $row_{MAX}$ point or at any random array column and row point as long as all column and row point counts are completed. The measuring apparatus thus accumulates event counts of the bit stream pulses falling within points inside the voltage threshold window comparator during durations of the binary pulse bit stream and draws eye diagrams therefrom defining the bit stream characteristics.

Figure 4:
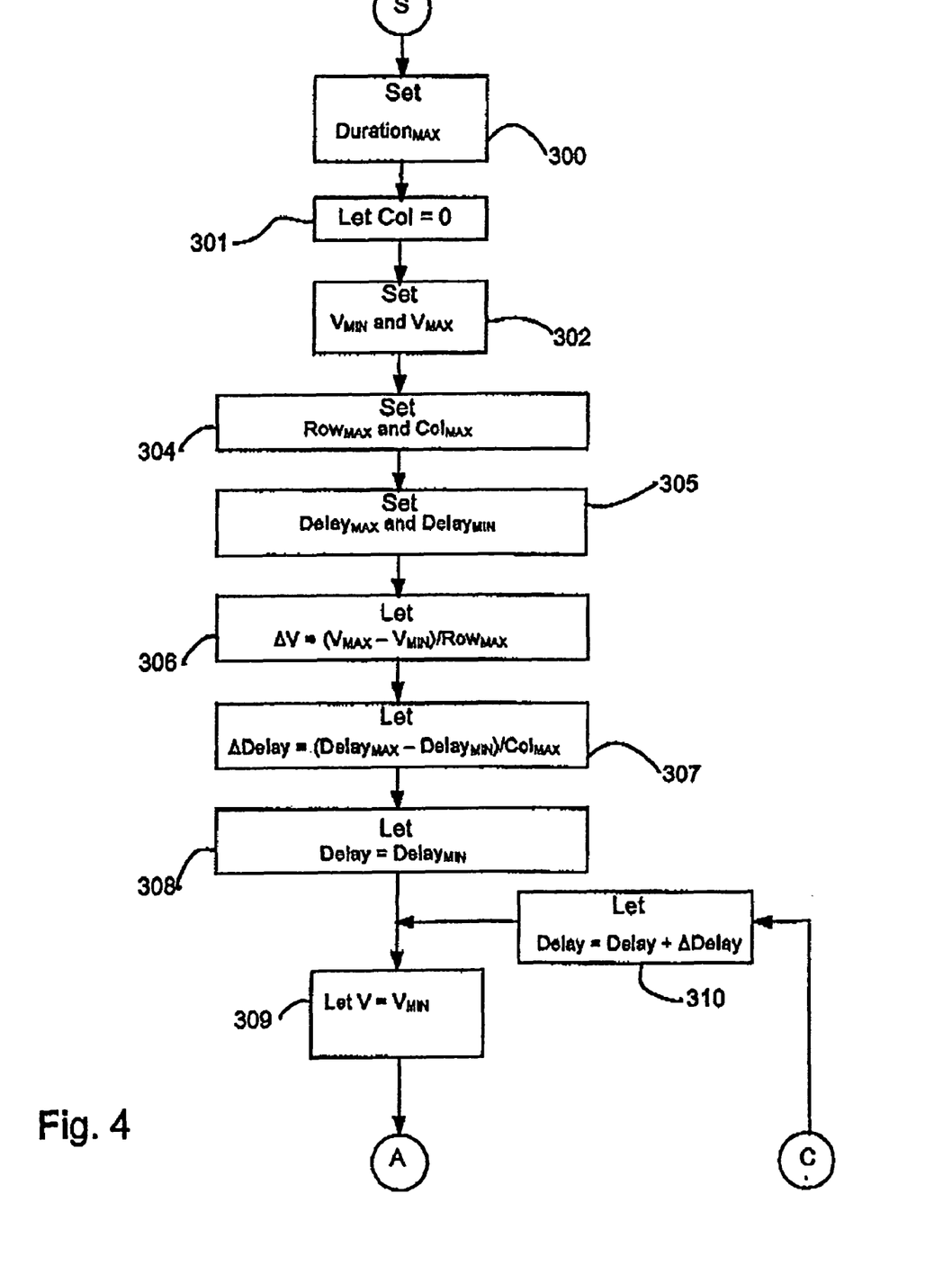
FIGS. 4, 5 and 6 is a flow chart of the method of operation of the binary pulse coded waveform measuring apparatus set forth in FIG. 1.
Figure 5:
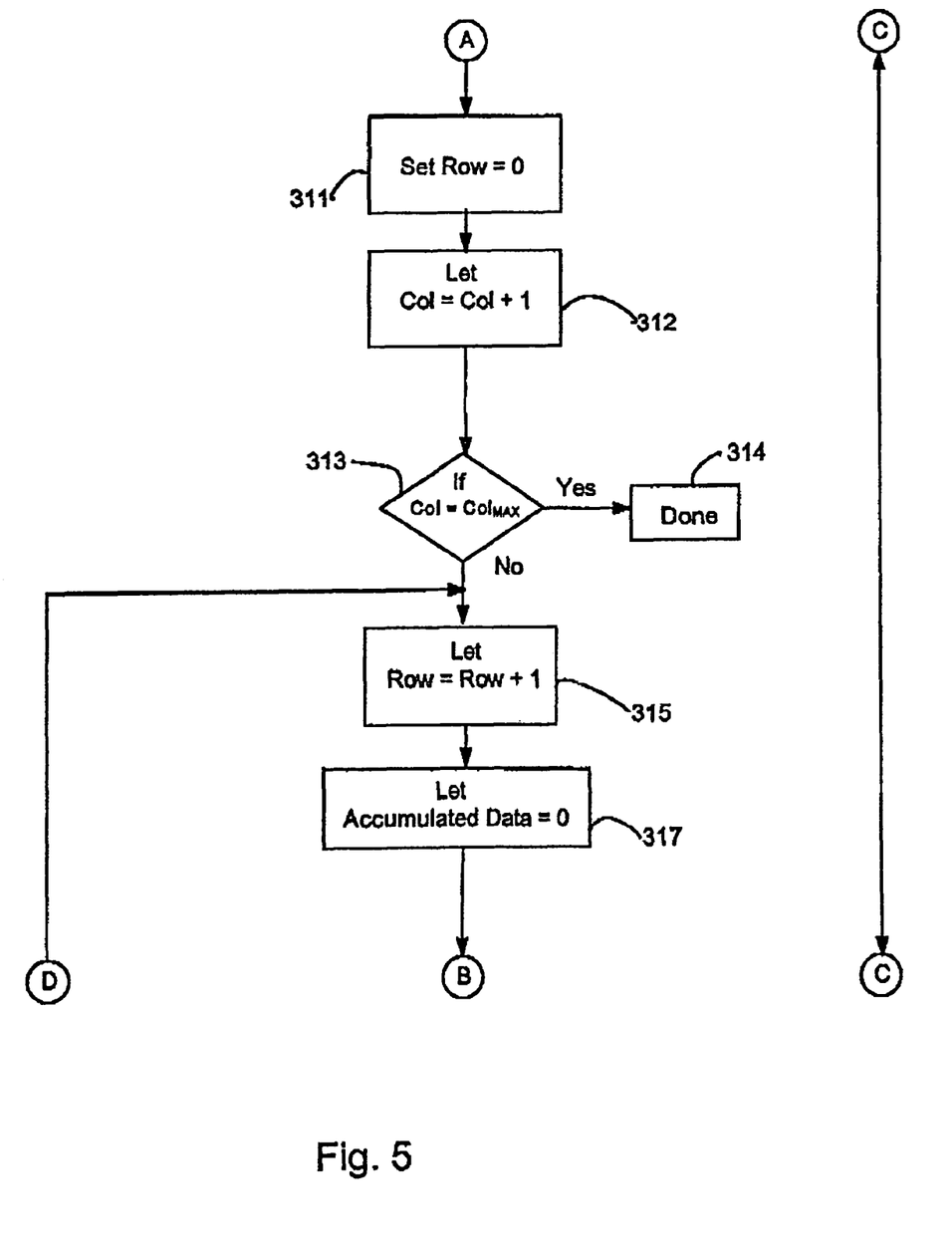
Figure 6:
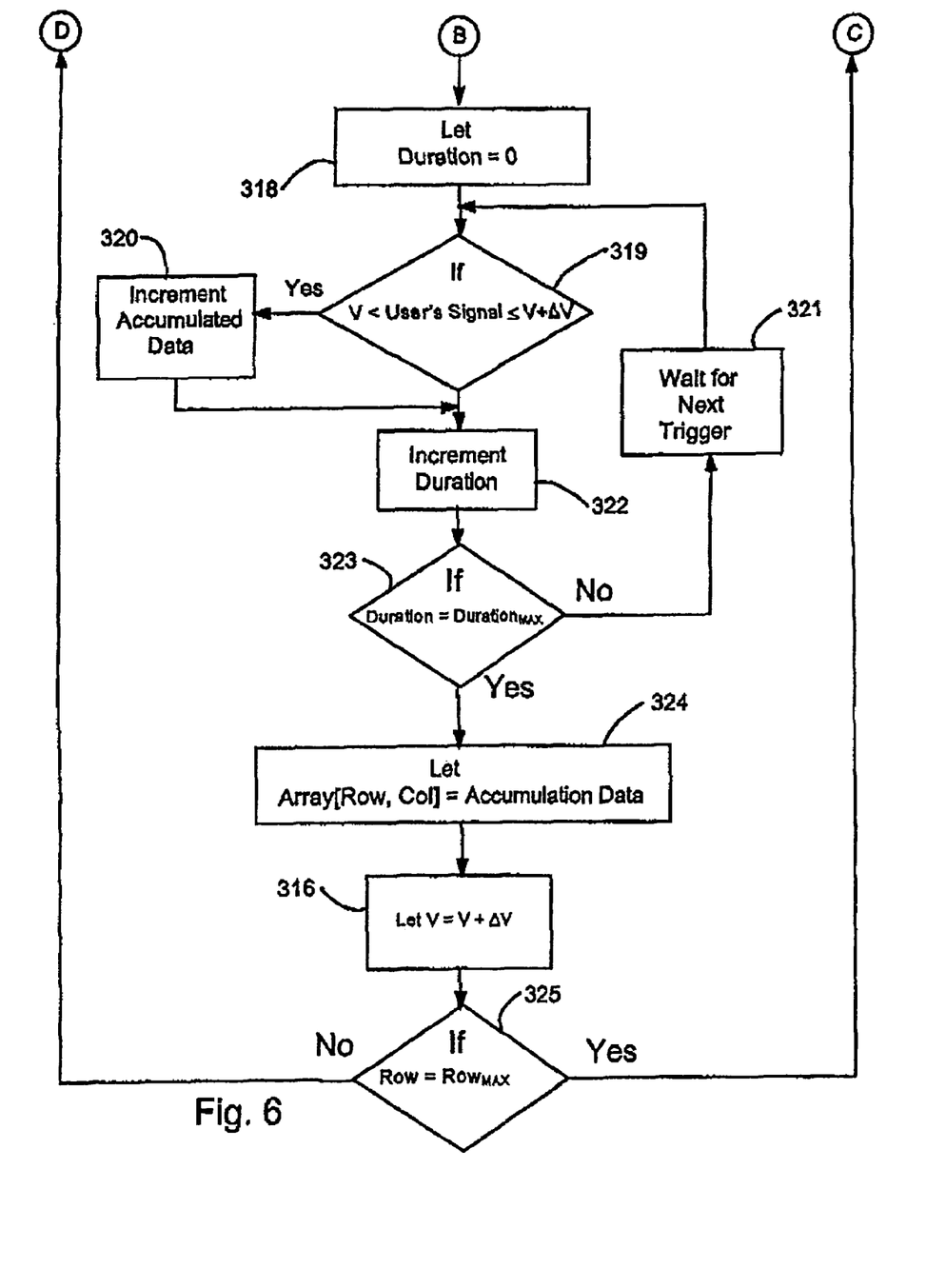

The method of operation, FIGS. 4, 5 and 6, defines the window comparator and accumulates various event counts of the bit stream pulses at time offsets during defined duration times of the binary pulse bit stream at points inside the window comparator and then draws an eye diagram therefrom defining the bit stream pulse characteristics. In operation, the method, FIG. 4, sets the value of $duration_{MAX}$, step 300, wherein the $duration_{MAX}$ is the period in which it is desired to accumulate event counts at an array column and row point. In accordance with embodiments of the invention, the value of $duration_{MAX}$ may be designed into duration counter 210, FIG. 2, or duration counter 210 may be a type of counter wherein a user may set a value of $duration_{MAX}$ into the counter which will generate an output when the accumulated count reaches the value that the user set into the counter 210.

The method continues to define the window comparator by letting the initial value of the array column be zero, step 301, and setting the value of the minimum and maximum voltage thresholds $V_{MIN}$ and $V_{MAX}$, step 302. The values of $V_{MIN}$ and $V_{MAX}$ depend upon the type of binary pulse bit stream to be measured and varies with the particular application. The size of the array is established by setting the values of $row_{MAN}$ and $col_{MAX}$, step 304. Again the size of $row_{MAN}$ and $col_{MAX}$ will depend upon the apparatus and the particular application. $Delay_{Max}$ and $delay_{MIN}$ are set to the user's requirement, step 305, and the value of ΔV is set equal to the value of $(V_{MAX}-V_{MIN})$ divided by the value of $row_{Max}$, step 306. The value of Δdelay is established as equal to the value of $(delay_{Max}-delay_{MIN})$ divided by the value of $col_{Max}$, step 307, and the value of delay is set to the value of $delay_{MIN}$, to initialize it, step 308.

Figure 3:
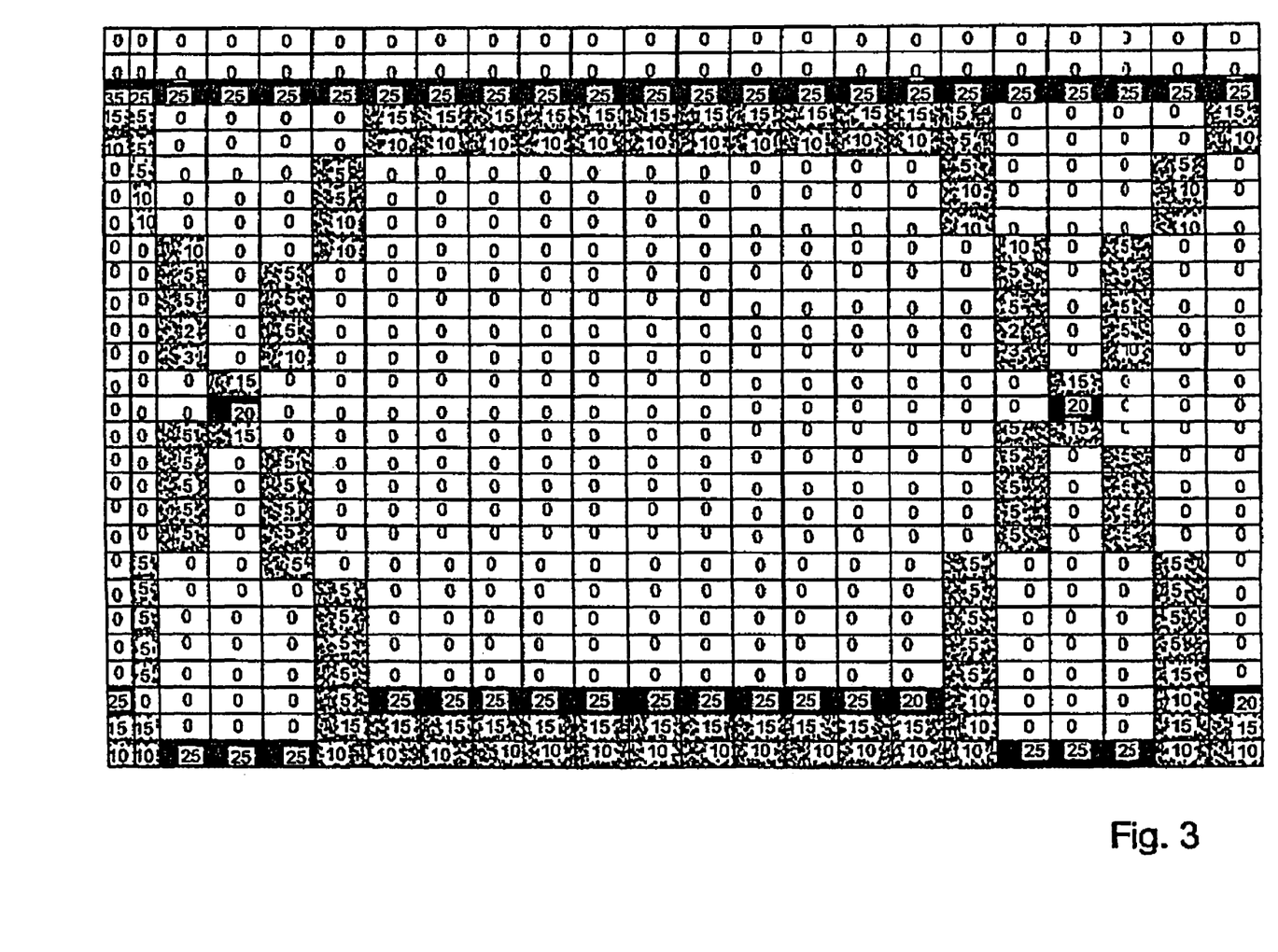
FIG. 3 is a diagram of a symbolic histogram formed by the measurement of the binary pulse bit stream set forth in FIG. 1.

At this point the window comparator, FIG. 3, has been defined by establishing an array of columns and rows defining the points for accumulating events such as pulse voltage level counts at times during the defined duration times. Although it is to be understood that the array column and row points could be selected randomly or started at column one and at the maximum row in accordance with the invention, the present invention will start at column one and row one. Thus, the value of V is set equal to $V_{MIN}$, step 309, the row initially set to zero, step 311, FIG. 5, and the column set to one, step 312, The method, step 313, determines that the measurement sequence is complete, or done, step 314, if the column and row points have reached the values of $col_{Max}$, step 313 and $row_{MAX}$, step 325, FIG. 6. If not, the value of row is set to row plus one, step 315, FIG. 5.

The measurement for the specific array (col, row) point is started, step 317, by initializing the accumulated data count of counter 207, FIG. 2, to zero and initializing the duration count to zero, step 318. At step 319, the logic apparatus, FIG. 2, detects voltage levels of the binary pulses occurring at time offsets of the bit stream when the pulse voltage levels are within the voltage threshold window between V and V+ΔV at each row and column point of the array. If the detected pulse voltage level is greater than the threshold level V and less than or equal to the threshold value V+ΔV, step 319, the accumulated data count of counter 207, FIG. 2, is incremented, step 320, and the value of duration incremented, step 322. If the value of duration has not reached $duration_{MAX}$, step 323, the method waits for the next trigger, step 321, and repeats steps 319, 320, 321, 322 and 323 until the value of duration reaches $duration_{MAX}$. When the value of duration reaches $duration_{MAX}$, the value of counter 207, FIG. 2, has recorded the number of times that the pulse voltage level of the binary pulses of the measured bit stream have been detected as being within the voltage threshold window during the total period of the duration interval at the specified time offset.

When it is determined that the value of duration has reached $duration_{MAX}$, step 323, the array[row, col] point, step 324, is set to the value of the data accumulated by counter 207, FIG. 2. The voltage threshold window, step 316, is then advanced between $V_{MIN}$ and $V_{MAX}$ by letting V equal V+ΔV in preparation for accumulating event counts for the next row of the column. If the array row has not reached $row_{MAX}$, step 325, the value of row is increased by one, step 315, FIG. 5, and steps 316 through 324 repeated to accumulate the pulse level data for the next row point of the column. If the value of the rows in a column has reached row$_{MAX}$, step 325, steps 309 through 325 are repeated to accumulate data for each of the rows of the next column. Thus, counts of the detected binary pulse voltage levels within the voltage threshold window are accumulated at time offsets during each duration part of the binary pulse bit stream in each column and row point of the array. When count data has been accumulated in the array row and column points, FIG. 3, the histrogram of the array is displayed as column and row points of accumulated event counts as an eye diagram defining characteristics of the measured bit stream of binary pulses.

It is obvious from the foregoing that the facility, economy and efficiently of binary pulse coded waveform measuring apparatus has been improved by apparatus arranged to use a window comparator to measure a high speed binary pulse bit stream and to generate a single histrogram for creating an eye diagram showing the characteristics and quality of the measured high speed binary pulse bit stream.

While the foregoing detailed description has described an embodiment of specific apparatus for measuring characteristics of a bit stream of binary pulses, it is to be understood that the above description is illustrative only and is not limiting of the disclosed invention. Particularly other configurations are within the scope and sprit of this invention. Thus, the invention is to be limited only by the claims set forth below.

What is claimed is:

1. Apparatus for measuring characteristics of a bit stream of binary pulses comprising
   control means for defining a window comparator, the control means includes programmable means for establishing an array of columns and rows defining the points for accumulating counts of pulse voltage levels at time offsets during the duration times and for creating a voltage threshold window that moves between a minimum and maximum voltage with chanaes of rows of the array and
   logic means for accumulating time and voltage counts of the bit stream pulses falling within voltage thresholds and points inside the window comparator during durations of the binary pulse bit stream and drawing eye diagrams therefrom defining the bit stream characteristics.

2. The apparatus for measuring characteristics of a bit stream of binary pulses set forth in claim 1 wherein the logic means comprises:
   logic circuitry for detecting voltage levels of the binary pulses occurring at various time offsets of the bit stream when the pulse voltage levels are within the voltage threshold window at each row and column point of the array.

3. The apparatus for measuring characteristics of a bait stream of binary pulses set forth in claim 2 wherein the logic means comprises:
   first counter means for accumulating counts of the detected binary pulse voltage levels at the time offsets during each duration part of the binary pulse bit stream in a column and row point of the array.

4. The apparatus for measuring characteristics of a bit stream of binary pulses set forth in claim 3 wherein the logic means comprises:
   second counter means for defining duration times of the bit stream of binary pulses to accumulate the counts of the detected binary pulse voltage levels falling within the voltage threshold window at each point of the array.

5. The apparatus for measuring characteristics of a bit stream of binary pulses set forth in claim 4 further comprising:
   apparatus for displaying the array column and row points of accumulated time and voltage counts as an eye diagram defining characteristics of the bit stream of binary pulses.

6. Apparatus for measuring characteristics of a bit stream of binary pulses comprising:
   control means for defining a window comparator of an array of columns and rows defining points for accumulating voltage counts of the binary pulse bit stream at time offsets during defined durations of the binary pulse bit stream, and
   apparatus for creating a voltage threshold window that moves between minimum and a maximum voltage levels with each row of the array and for accumulating counts of voltage levels of the binary pulses occurring at the time offsets of the bit stream during a duration time when the pulse voltage levels are within the voltage threshold window at each row and column point of the array and displaying the array column and row points of the accumulated time and voltage counts as an eye diagram defining characteristics of the bit stream of binary pulses.

7. Apparatus for measuring characteristics of a bit stream of binary pulses comprising:
   first control means for defining a window comparator of an array of columns and rows defining points for accumulating event counts at time offsets during defined duration times of the binary pulse bit stream,
   second control means for creating a voltage threshold window that moves between a minimum and maximum voltage threshold with each row of the array,
   logic means for detecting voltage levels of the binary pulses occurring at time offsets of the bit stream when the pulse voltage levels are within the voltage threshold at each row and column point of the array,
   first counter means for accumulating counts of the detected binary pulse voltage levels at time offsets during each defined duration time of the binary pulse bit stream in a column and row point of the array,
   second counter means for determining duration of periods of the binary bit stream in which to accumulate the detected binary pulse voltage levels at each point of the array, and
   monitor apparatus for displaying the array column and row points of the accumulated event counts as an eye diagram defining characteristics of the bit stream of binary pulses.

8. A method for determining characteristics of a bit stream of binary pulses comprising the steps of
   defining a window comparator,
   establishing an array of columns and rows defining the points for accumulating the event counts at time offsets during the defined duration times;
   creating a voltage threshold window that moves with respect to a minimum and maximum voltage threshold wherein the voltage threshold window changes with respect to the rows of the array, and
   accumulating various voltage counts of the bit stream pulses at time offsets during defined duration times of the binary pulse bit stream within voltage thresholds at points inside the window comparator and drawing an eye diagram therefrom defining the bit stream pulse characteristics.

9. The method for determining characteristics of the bit stream of binary pulses set forth in claim 8 wherein the event count accumulating step comprises the step of:
  detecting voltage levels of the binary pulses occurring at the time offsets of the bit stream when the pulse voltage levels are within the voltage threshold window at each row and column point of the array.

10. The method for determining characteristics of the bit stream of binary pulses set forth in claim 8 wherein the event count accumulating step comprises the step of:
  accumulating counts of the detected binary pulse voltage levels at the time offsets during each duration part of the binary pulse bit stream in a column and row point of the array.

11. The method for determining characteristics of the bit stream of binary pulses set forth in claim 10 wherein the event count accumulating step comprises the step of:
  displaying the array column and row points of accumulated event counts as an eye diagram defining characteristics of the bit stream of binary pulses.

12. A method for determining characteristics of a bit stream of binary pulses comprising the steps of:
  defining a window comparator of an array of columns and rows defining points for accumulating event counts of the binary pulse bit stream at time offsets during defined durations of the binary pulse bit stream;
  creating a voltage threshold window that moves between a minimum voltage and a maximum voltage at each row of the array; and
  accumulating counts of voltage levels of the binary pulses occurring at time offsets of the bit stream during a duration time when the pulse voltage levels are within the voltage threshold window at each row and column point of the array and displaying the array column and row points of the accumulated event counts as an eye diagram defining characteristics of the bit stream of binary pulses.

13. A method for determining characteristics of a bit stream of binary pulses comprising the steps of:
  defining a window comparator of an array of columns and rows defining points for accumulating event counts at time offsets during defined duration times of the binary pulse bit stream;
  creating a voltage threshold window that moves between defined voltage levels at each row of the array;
  detecting voltage levels of the binary pulses occurring at the time of the bit stream when the pulse voltage levels are within the voltage threshold window at each row and column point of the array;
  accumulating counts of the detected binary pulse voltage levels at the time offsets in a column and row point of the array; and
  displaying the array column and row points of the accumulated time and voltage counts as an eye diagram defining characteristics of the bit stream of binary pulses.

* * * * *